(No Model.)

A. L. HALL.
SUPPLEMENTAL SEAT FOR VEHICLES.

No. 540,384. Patented June 4, 1895.

A. L. Hall, Inventor
By Wilhelm & Bonner
Attorneys.

Chas. F. Burkhardt
F. Gustav. Wilhelm. } Witnesses.

UNITED STATES PATENT OFFICE.

ABBOTT L. HALL, OF CAMBRIDGE, MASSACHUSETTS.

SUPPLEMENTAL SEAT FOR VEHICLES.

SPECIFICATION forming part of Letters Patent No. 540,384, dated June 4, 1895.

Application filed September 11, 1894. Serial No. 522,690. (No model.)

*To all whom it may concern:*

Be it known that I, ABBOTT L. HALL, a citizen of the United States, residing at Cambridge, in the county of Middlesex and State of Massachusetts, have invented new and useful Improvements in Supplemental Vehicle-Seats, of which the following is a specification.

This invention relates to the auxiliary or supplemental seats which are placed upon the main seat of a vehicle for accommodating a third person without annoyance or discomfort to the occupants of the main seat.

My invention has the object to produce a seat of this character which is reliably held in place upon the main seat without the use of screws, clamps or other fastenings, which can be manufactured at small cost and which can be folded into compact form, so that it may be stored under the main seat or in the vehicle box when not in use.

Figure 1:
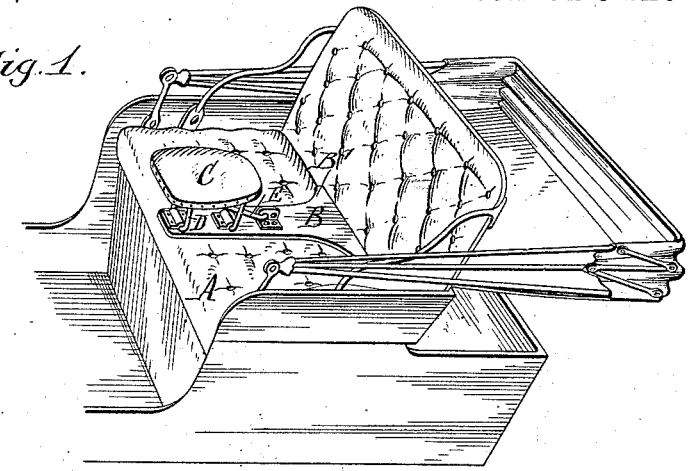
Figure 2:
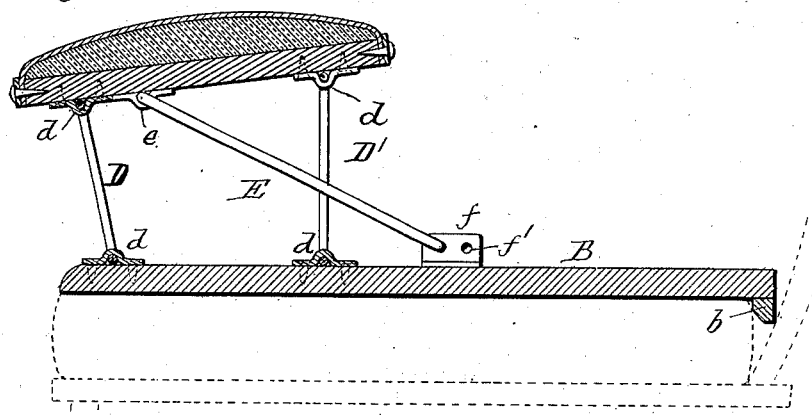
Figure 3:
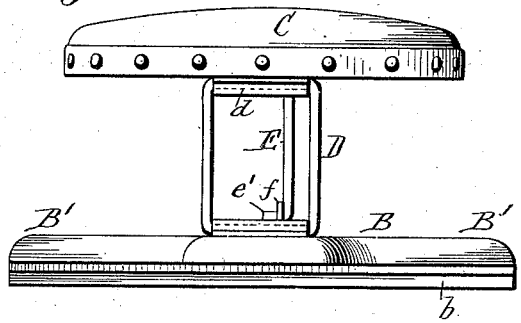
Figure 4:
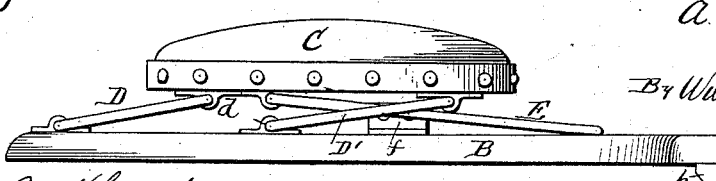

In the accompanying drawings, Figure 1 is a fragmentary perspective view of a buggy, showing my improved supplemental seat in place on the buggy-seat. Fig. 2 is a longitudinal section of the supplemental seat on an enlarged scale. Fig. 3 is a front view thereof. Fig 4 is a side elevation of the seat, showing it folded.

Like letters of reference refer to like parts in the several figures.

A is the cushion of the buggy seat, and B is a narrow base board on which the supplemental seat C is mounted and which is adapted to rest loosely upon the central portion of the cushion A between the two occupants of the main seat. This base board is about as long as the width of the cushion and its rear portion is flared or enlarged rearwardly, as shown, to form lateral extensions B'. These extensions project behind the persons on the buggy seat and thus hold the board against forward displacement, and by widening the board they also prevent rocking of the same on the cushion.

*b* is a transverse lip or cleat secured to the under side of the base board at its rear end, and adapted to engage behind the upper rear edge of the seat cushion, so as to aid in preventing the base board from shifting forward.

D and D' represent folding standards which support the supplemental seat and whereby the latter is pivotally connected with the front portion of the base board in such a manner as to be capable of folding toward the same. Each of the standards preferably consists of an open rectangular loop of heavy wire having its upper and lower cross bars pivoted by clips or bearings *d* to the under side of the seat and the upper side of the base board respectively.

E is an inclined brace whereby the folding seat is held in its normal elevated position. This brace is pivoted at its upper end to the under side of the supplemental seat by a clip or bearing *e*, while the lower end of the brace is detachably connected to the base board. For this purpose the brace is formed at its lower end with a laterally bent lip or stud *e'* which engages with a perforated lug or ear *f* secured to the upper side of the base board behind the rear standard, the brace passing through the latter. The front standard is preferably somewhat shorter than the rear standard, to give the supplemental seat a slight forward pitch. To enable the seat to be adjusted to that position or to a substantially horizontal position, if desired, the lug *f* has two openings *f'* arranged one in front of the other, the seat being retained in a horizontal position by engaging the brace with the rear opening of the lug and in a forwardly inclined position by engaging the brace with the front opening of the lug. The elasticity of the brace permits it to be sprung laterally into and out of the lug openings.

As the base board of the supplemental seat is in no way fastened to the buggy seat but rests loosely thereon it is readily put in place for use and removed when not required. When in position on the buggy seat it overhangs the laps of the persons occupying the buggy seat and it therefore supports a third person comfortably without crowding or otherwise discommoding the other occupants of the vehicle.

When the supplemental seat is not required, it is readily folded by disconnecting its brace from the lug of the base board and swinging it rearward toward the latter as shown in Fig. 4, in which compact form it can be conveniently stored under the buggy seat where it is out of the way.

This supplemental seat comprises but few parts which renders its construction very simple and its cost of manufacture comparatively small.

I claim as my invention—

1. The combination with a base board adapted to rest upon the main seat of a vehicle, of a supplemental seat arranged above said base board, folding front and rear standards both pivoted at their lower ends to the base board and at their upper ends to the supplemental seat and a folding brace independent of said standards, connecting the supplemental seat with the base board, substantially as set forth.

2. The combination with a base board adapted to rest upon the main seat of a vehicle, of a supplemental seat arranged above said base board, folding front and rear standards both pivoted at their lower ends to the base board and at their upper ends to the supplemental seat, a perforated lug secured to the upper side of the base board in rear of said supplemental seat, and a rearwardly inclined brace pivoted at its upper end to the supplemental seat and provided at its lower end with an angular lip or stud which engages with the perforated lug of the base board, substantially as set forth.

3. The combination with a base board adapted to rest upon the main seat of a vehicle, of a supplemental seat arranged above said base board, folding front and rear standards connecting the supplemental seat with said base board and each consisting of an open rectangular loop having its upper and lower cross bars pivoted to the under side of the seat and the upper side of the base board respectively, and an inclined folding brace connecting the supplemental seat with the base board and passing through the rear supporting loop of said seat, substantially as set forth.

4. A removable supplemental vehicle seat comprising a base board adapted to rest loosely on the main seat and having a narrow front portion and lateral rear extensions provided with a downwardly projecting lip adapted to engage behind the rear edge of the main seat, and a folding seat supported upon the narrow front portion of the base board, substantially as set forth.

Witness my hand this 7th day of August, 1894.

ABBOTT L. HALL.

Witnesses:
CARL F. GEYER,
ELLA R. DEAN.